United States Patent
Li et al.

(10) Patent No.: US 9,451,445 B2
(45) Date of Patent: *Sep. 20, 2016

(54) ELECTRONIC SUBSCRIBER IDENTITY MODULE SELECTION

(71) Applicant: Apple Inc., Cupertino, CA (US)

(72) Inventors: Li Li, Los Altos, CA (US); Ben-Heng Juang, Milpitas, CA (US); Arun G. Mathias, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 150 days.

This patent is subject to a terminal disclaimer.

(21) Appl. No.: 14/502,448

(22) Filed: Sep. 30, 2014

(65) Prior Publication Data

US 2015/0350878 A1 Dec. 3, 2015

Related U.S. Application Data

(60) Provisional application No. 62/005,870, filed on May 30, 2014.

(51) Int. Cl.
*H04W 8/18* (2009.01)
*H04W 8/20* (2009.01)

(52) U.S. Cl.
CPC .............. *H04W 8/183* (2013.01); *H04W 8/20* (2013.01)

(58) Field of Classification Search
CPC ............................ H04W 4/003; H04W 8/183
See application file for complete search history.

(56) References Cited

U.S. PATENT DOCUMENTS

| | | | |
|---|---|---|---|
| 8,800,015 B2 * | 8/2014 | Christopher .......... | H04W 12/04 380/270 |
| 2011/0010755 A1 | 1/2011 | Virtanen | |
| 2011/0053504 A1 | 3/2011 | Corda | |
| 2012/0115441 A1 * | 5/2012 | Schell .................. | H04L 63/0853 455/411 |
| 2012/0190354 A1 * | 7/2012 | Merrien ................ | H04W 4/001 455/422.1 |
| 2012/0331292 A1 * | 12/2012 | Haggerty ............. | H04L 63/0272 713/168 |
| 2013/0023309 A1 | 1/2013 | Holtmanns et al. | |
| 2013/0196621 A1 * | 8/2013 | Guday ................... | H04W 24/02 455/406 |

(Continued)

FOREIGN PATENT DOCUMENTS

EP 2731381 A2 5/2014

OTHER PUBLICATIONS

PCT Application No. PCT/US2015/030876—International Search Report & Written Opinion dated Sep. 4, 2015.

*Primary Examiner* — Bobbak Safaipour
(74) *Attorney, Agent, or Firm* — Downey Brand LLP

(57) ABSTRACT

Embodiments are described for identifying and accessing an electronic subscriber identity module (eSIM) and associated content of the eSIM in a multiple eSIM configuration. An embedded Universal Integrated Circuit Card (eUICC) can include multiple eSIMs, where each eSIM can include its own file structures and applications. Some embodiments include a processor of a mobile device transmitting a special command to the eUICC, including an identification that uniquely identifies an eSIM in the eUICC. After selecting the eSIM, the processor can access file structures and applications of the selected eSIM. The processor can then use existing commands to access content in the selected eSIM. The special command can direct the eUICC to activate or deactivate content associated with the selected eSIM. Other embodiments include an eUICC platform operating system interacting with eSIMs associated with logical channels to facilitate identification and access to file structures and applications of the eSIMs.

20 Claims, 10 Drawing Sheets

(56) References Cited

U.S. PATENT DOCUMENTS

| | | |
|---|---|---|
| 2013/0227646 A1 | 8/2013 | Haggerty et al. |
| 2013/0281085 A1 | 10/2013 | Sen et al. |
| 2014/0088731 A1* | 3/2014 | Von Hauck ........... H04W 12/06 700/14 |
| 2014/0134981 A1 | 5/2014 | Park et al. |
| 2015/0004955 A1* | 1/2015 | Li ........................... H04W 4/16 455/418 |
| 2015/0007348 A1* | 1/2015 | Holtmanns ........... H04W 4/003 726/28 |
| 2015/0031408 A1* | 1/2015 | Kalla .................... H04W 52/38 455/522 |
| 2015/0222635 A1* | 8/2015 | Yang ..................... H04B 1/3816 726/4 |
| 2015/0237216 A1* | 8/2015 | Gonzalez ............... H04M 15/06 455/406 |
| 2015/0289137 A1* | 10/2015 | Yang ..................... H04B 1/3816 455/411 |
| 2015/0349826 A1* | 12/2015 | Li ........................ H04B 1/3816 455/558 |
| 2015/0350877 A1* | 12/2015 | Li ........................... H04W 8/183 455/558 |
| 2015/0350878 A1* | 12/2015 | Li ........................... H04W 8/183 455/558 |
| 2015/0350879 A1 | 12/2015 | Li et al. |

\* cited by examiner

ELECTRONIC SUBSCRIBER IDENTITY MODULE SELECTION

CROSS REFERENCE TO RELATED APPLICATIONS

This application claims the benefit of U.S. Provisional Patent Application No. 62/005,870, filed May 30, 2014, and entitled "ELECTRONIC SUBSCRIBER IDENTITY MODULE (eSIM) SELECTION," which is incorporated by reference herein in its entirety for all purposes.

This application is related to U.S. patent application Ser. No. 14/503,048, filed Sep. 30, 2014, entitled "Electronic Subscriber Identity Module Application Identifier Handling" which is incorporated by reference herein in its entirety for all purposes.

FIELD

The described embodiments generally relate to embedded Universal Integrated Circuit Cards (eUICCs) and electronic Subscriber Identity Modules (eSIMs). In particular, the described embodiments involve enabling a mobile device to access eSIM content in a multiple eSIM environment.

BACKGROUND

Most mobile devices are configured to receive and operate removable Universal Integrated Circuit Cards (UICCs) that enable the mobile devices to access services provided by mobile network operators (MNOs). In particular, each UICC includes at least a microprocessor and a read-only memory (ROM), where the ROM is configured to store different applets and authentication data that the mobile device can utilize to register and interact with the MNOs. Typically, a UICC takes the form of a small removable card (e.g., a SIM card) that is configured to store a single MNO profile and be inserted into a UICC-receiving bay included in a mobile device. In more recent implementations, however, UICCs are being embedded directly into system boards of mobile devices and are configured to store multiple MNO profiles, referred to herein as electronic SIMs (eSIMs). For example, an embedded UICC (eUICC) can store one eSIM for a local MNO and another eSIM for an international MNO. Notably, these eUICCs provide several advantages over traditional, removable UICCs. For example, some eUICCs include a rewritable memory that can facilitate eSIM updates for accessing extended features provided by MNOs. The eUICCs also eliminate the necessity of including UICC-receiving bays within mobile devices. The implementation of eUICCs therefore not only increases the flexibility of mobile devices, but also simplifies their design and frees up space for other components.

Although eUICCs provide many benefits over traditional, removable UICCs, implementing eUICCs present new challenges with respect to how eSIM content is accessed by mobile devices. For example, MNOs share many of the same properties as one another, and, as a result, eSIMs can often include applications that share the same application identifier (AID). Consequently, a mobile device whose eUICC includes two or more eSIMs that share similarities may not be able to successfully select and access an application of a particular one of the two or more eSIMs. More specifically, existing protocols for accessing applications involve referencing only the AID, which is not sufficient for the mobile device to access an application of a particular eSIM because the AID alone does not uniquely identify the application of the particular eSIM that includes the application. Therefore, there exists a need for enabling a mobile device—specifically, a processor included in the mobile device—to access specific eSIM content, such as an application of a particular eSIM, in a multiple eSIM environment.

SUMMARY

An eUICC can store multiple eSIMs, and each eSIM can store its own content (e.g., applications and file structures). With this configuration of multiple eSIMs on the eUICC, however, a problem arises: how to identify and access the content of different eSIMs stored on the same eUICC. For example, when the mobile device uses an existing interface to send a read command for a file identified by a file identifier (FID), there can be a conflict because the same FID can exist within multiple eSIMs. Consequently, the eUICC may not be capable of accessing the file for a specific eSIM using only the FID. The embodiments set forth herein address this problem by introducing a special command that can be transmitted to the eUICC from the mobile device. Specifically, the special command includes an identifier that uniquely identifies an eSIM to be selected, and can direct the eUICC to activate or deactivate content included in the eSIM. After selecting an eSIM, the mobile device can view the content (e.g., applications and file structures) of the eSIM. In this manner, the mobile device can access the content of a specific eSIM stored by an eUICC even when similarities exist across other eSIMs stored by the eUICC.

Additionally, conflicts can occur in the eUICC when attempting to access an application based solely on an application identifier (AID) associated with the application. To cure this deficiency, logical channels can be used to separate the manner in which eSIMs are accessed by the eUICC. Logical channels are defined in existing standards such that the mobile device can open multiple logical channels to access different applications of an eSIM. More specifically, the existing standards dictate that an application of an eSIM must first be selected on a logical channel before the application can be accessed. Accordingly, an operating system (OS) executing on the eUICC has prior knowledge of the eSIM that is being selected on a logical channel. The embodiments set forth herein expand this functionality to enable the selection of different eSIMs (as opposed to the applications themselves) on different logical channels. Subsequently, each application can be uniquely identified by the command SELECT (eSIM ID, AID). Terminals of a mobile device (e.g., baseband processors) that interact with the eUICC can be aware of the different eSIMs managed by the eUICC, e.g., by managing the various eSIM IDs. In this manner, the processor in the mobile device can simultaneously access specific applications across multiple eSIMs in the eUICC.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
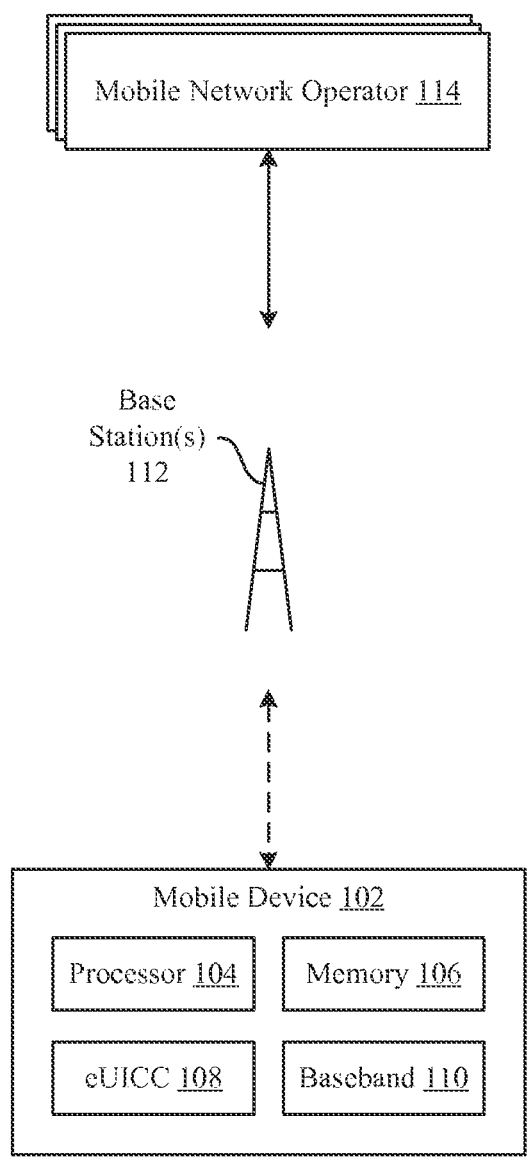
FIG. 1 illustrates a block diagram of different components of a wireless system including a MNO, base station and a mobile device configured to implement the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

A UICC is a smart card used in mobile terminals for cellular networks, including Universal Mobile Telecommunications Systems (UMTS) and Long Term Evolution (LTE) networks. Specifically, a UICC authenticates a subscriber to a cellular network while ensuring the integrity and security of the subscriber's personal data. The UICC also stores applications for both MNO and end-user use for the correct deployment of mobile services. The UICC is a generic multi-application platform that is able to host several applications in parallel.

The UICC includes a SIM that is an integrated circuit that securely stores an international mobile subscriber identity (IMSI) and a related key used to identify and authenticate a subscriber on a mobile telephony device (such as a mobile phone). In initial implementations, a SIM circuit is embedded into a removable plastic card. This plastic card can be called a "SIM card" and can be transferred between different mobile devices. A SIM card contains a unique serial number, an Integrated Circuit Card ID (ICCID), an international mobile subscriber identity (IMSI), security authentication and ciphering information, temporary information related to the local network, a list of the services to which the user has access, and authentication information (e.g., passwords).

Over time, the role of the UICC has evolved and it has become the only MNO-owned part of the network residing in the hands of subscribers. Therefore, the UICC can be a useful tool for an MNO to securely provide services to subscribers. And, due to its portability and ability to work in many mobile handsets, the UICC enables the MNO to offer network specific services and customization irrespective of the mobile phone being used. This uniqueness of the UICC allows a variety of new enhanced features, all to the benefit of the MNO and the subscriber.

As previously noted, UICCs are being embedded directly into system boards (i.e. eUICCs) of mobile devices and can be configured to manage multiple electronic SIMs (eSIMs), e.g., one eSIM for a local MNO and another eSIM for an international MNO. These eUICCs can provide several advantages over traditional, removable UICCs. For example, some eUICCs include a rewritable memory that can facilitate eSIM updates for accessing extended features provided by MNOs. Notably, each eSIM can have its own file structure and applications. The problem to solve, therefore, is how to identify and access content of multiple eSIMs on the same eUICC. For example, if the mobile device uses an existing interface to send a read command for a file identified by a FID, there can be a conflict since the same FID could exist within and be relevant to another eSIM. Consequently, the eUICC may not know how to access the particular file identified by the FID.

Some other considerations include the following: standards for UICC implementation specify that AIDs are used to identify applications installed on SIMs. An AID includes a 5-byte application provider ID and an 11-byte (or fewer) proprietary AID. The AID is determined during card provisioning, e.g., during a manufacturing process by a vendor. An issue with eUICC implementation concerns the ambiguity of AIDs in a multiple eSIM environment. As previously set forth herein, an eUICC can include multiple eSIMs. Notably, these eSIMs can come from different uncoordinated sources, e.g., AT&T and T-Mobile. In some cases, the different sources can use the same AID such that the uniqueness of the AID is not preserved across the different eSIMs. Hence, a conflict can occur if the eUICC includes multiple eSIMs whose applications share a same AID.

To address the aforementioned issues, the embodiments described herein set forth a technique whereby the mobile device can send to the eUICC a special command that includes an identifier that uniquely identifies an eSIM managed by the eUICC. Specifically, the special command can direct the eUICC to activate or deactivate the content included in the eSIM. After the eSIM is selected, the file structures and applications of the eSIM can be accessed by the mobile device using existing commands (e.g., READ). The mobile device can select a different eSIM by first deactivating the active eSIM and then activating the different eSIM. The foregoing technique can also provide compatibility benefits such that an eUICC with an active eSIM can be installed in a legacy device and successfully operate in the legacy device. For this functionality, the eUICC needs to store the last-selected eSIM, and, when a boot-up of the legacy device is carried out, the eUICC can automatically select the previously-selected eSIM.

As previously set forth herein, logical channels are defined in existing standards such that the mobile device can open different logical channels to access different applications in an eSIM. The embodiments set forth herein expand the functionality to allow selection of different eSIMs (as opposed to their applications) on different logical channels. This feature can allow the mobile device to simultaneously access multiple eSIMs and their associated content. Relative to accessing the same application in a multiple eSIM environment, a solution can be defined utilizing the external entity coordination principles of the standards. The principles include: 1) AIDs within the same eSIM are unique, i.e., guaranteed by the eSIM vendor (similar to existing UICC standards), and 2) AIDs from different eSIM vendors can be duplicated on the eUICC.

With eUICC OS handling, a mobile device can open multiple logical channels to an eUICC and avoid AID conflicts. Specifically, the application's associated eSIM is first associated to a given logical channel before the application can be selected. Thus, the eUICC OS can have the knowledge of which eSIM is associated with an AID on a given logical channel. Each application can be uniquely identified by the command SELECT (eSIM ID, AID). Terminals (i.e., baseband processors) can be aware of the different eSIMs managed by the eUICC, e.g., by managing the various eSIM IDs. This solution can be implemented without major changes to the interface.

Accordingly, the foregoing approaches provide techniques systems to identify and access content of different eSIMs in an eUICC. A more detailed discussion is set forth below and described in conjunction with FIGS. 1-2, 3A, 3B, 3C, 4, 5A, 5B, 5C, 6A, 6B, 6C, and 7, which illustrate detailed diagrams of systems and methods that can be used to implement these techniques.

Terms relevant to embodiments set forth herein are described as follows.

AID—Application Identifier that identifies an application within a UICC. The AID can include a registered application provider Identifier (RID) of 5 bytes and a proprietary application identifier extension (PIX) of up to 11 bytes. The AID of an application can be unique on a given UICC. The AID is determined during card provisioning, e.g., during a manufacture process by a vendor.

APDU—Application Protocol Data Unit.

EUM—An eUICC Manufacturer.

ICCID—Integrated Circuit Card ID—A unique number to identify an eSIM within an eUICC.

IMSI—International Mobile Subscriber Identity. The IMSI is a unique identifier owned and issued by MNOs that identify a user and enable mobile devices to attach to a network and use services.

MCC—Mobile Country Code.

MNO—Mobile Network Operator. An MNO is an entity that provides access capability and communication services to its customers through a mobile network infrastructure.

OTA Platform—Over the Air Platform. An MNO-based platform used for remote management of UICCs and enabled eSIMs on eUICCs.

SIM—Subscriber Identity Module.

eSIM—Electronic SIM. An eSIM is a software-based SIM, or "soft SIM". The eSIM can be a combination of a file structure, data and applications to be provisioned onto, or present on, an eUICC. Specifically, an eSIM, when enabled, allows access to a specific mobile network infrastructure.

SM-SR—Subscription Manager Secure Routing.

UICC—Universal Integrated Circuit Card.

eUICC—an Embedded UICC.

USIM—Universal Subscriber Identity Module. A USIM is a network access application (NAA) for a UMTS. The USIM on a UICC can contain information that identifies a subscriber.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11 ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

FIG. 1 illustrates a block diagram of different components of a system 100 that is configured to implement the various techniques described herein, according to some embodiments. More specifically, FIG. 1 illustrates a high-level overview of the system 100, which, as shown, includes a mobile device 102, one or more base stations 112, and one or more MNOs 114. According to one embodiment, the mobile device 102 represents a wireless communication device (e.g., a smart phone, a tablet, a laptop, etc.) that is capable of communicating with at least one of the MNOs 114 via at least one of the base stations 112. As shown in FIG. 1, the mobile device 102 can include a processor 104, a memory 106, an eUICC 108, and a baseband processor 110. The eUICC 108 can represent, for example, a hardware component that is embedded within a system board of the mobile device 102 and is configured to provide a more flexible environment than traditional, removable UICCs. As described in greater detail below, the eUICC 108 can include a variety of hardware/software components that enable the eUICC 108 to manage eSIMs according to the techniques described herein.

Figure 2:
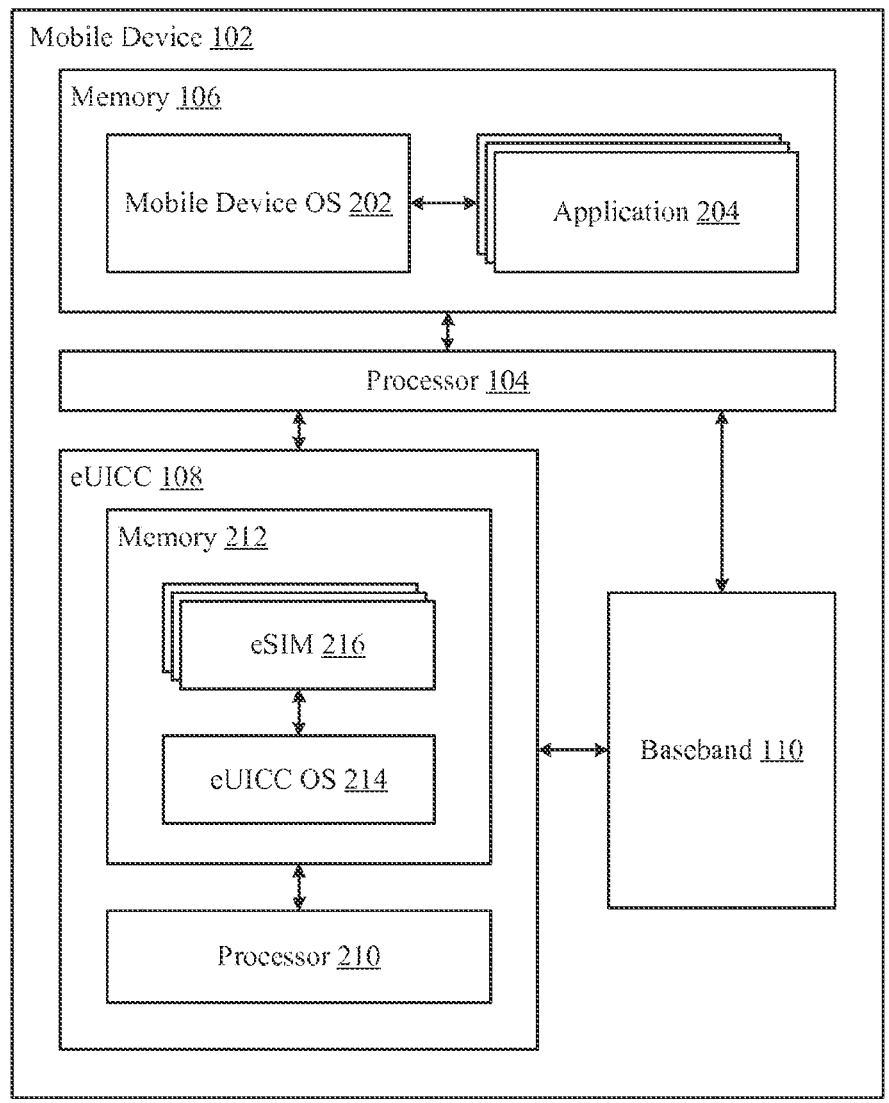
FIG. 2 illustrates a block diagram of a more detailed view of particular components of the system of FIG. 1, according to some embodiments.

FIG. 2 illustrates a more detailed view 200 of the mobile device 102 of FIG. 1, according to one embodiment. As shown in FIG. 2, a mobile device OS 202 and one or more applications 204 can execute on the mobile device 102 by way of the processor 104 and the memory 106. FIG. 2 also illustrates the various hardware/software components described above that are included in the eUICC 108. More specifically, the eUICC 108 can include a processor 210 and a memory 212 that enable an eUICC OS 214 to execute within the eUICC 108 and manage one or more eSIMs 216. According to this configuration, the processor 104, the processor 210, and the baseband processor 110 can work in conjunction to enable the mobile device 102 to access services provided by at least one of the MNOs 114.

Figure 3A:
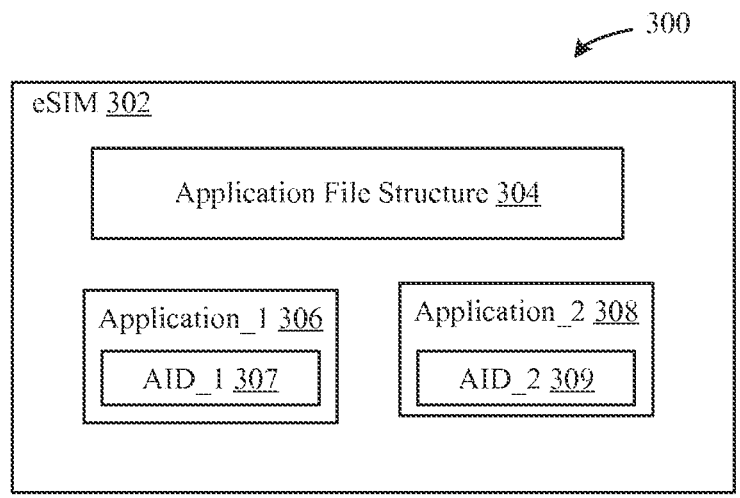
FIG. 3A illustrates a block diagram of an eSIM, according to some embodiments.

FIG. 3A illustrates a block diagram 300 of an eSIM 302 that includes an application file structure 304, as well as an application_1 306 and an application_2 308. As illustrated in FIG. 3A, the application_1 306 and the application_2 308 are identified by application identifiers AID_1 307 and AID_2 309, respectively. The application_1 306 and the application_2 308 can represent different applications provided by the MNO associated with the eSIM 302. Via the application identifiers, AID_1 307 and AID_2 309, the mobile device 102 can uniquely access either of the application_1 306 and the application_2 308. As described in greater detail below in conjunction with FIG. 3C, this access capability enables the mobile device 102 to appropriately access the application file structure 304.

Figure 3B:
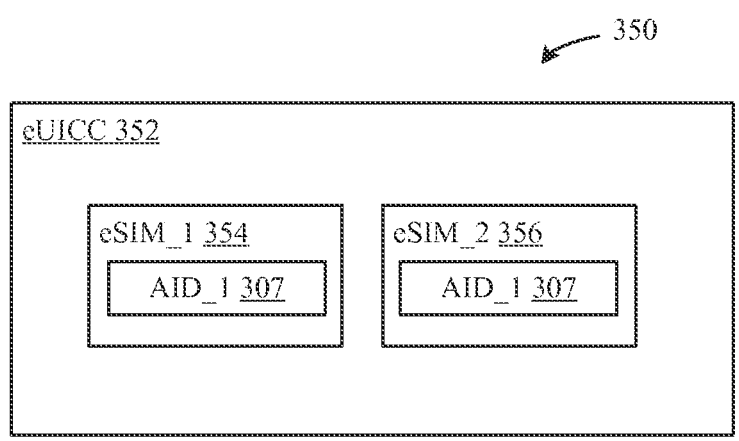
FIG. 3B illustrates a block diagram of an eUICC that stores multiple eSIMs, according to some embodiments.

FIG. 3B illustrates a block diagram 350 of an eUICC 352 that stores multiple eSIMs 216, which are represented in FIG. 3B as eSIM_1 354 and eSIM_2 356. In this embodiment, the applications (not illustrated in FIG. 2B) associated with the eSIM_1 354 and the eSIM_2 356 are identified by the same application identifier, AID_1 307. Hence, an application in eSIM_1 354 and eSIM_2 356 can be the same application, and the application can be provided by a different MNOs. Referring to FIG. 3B, the ICCID is the same for eSIM_1 354 and eSIM_2 356. There can be a conflict if the baseband processor 110 reads the ICCID, since a unique application identifier (hence, application) cannot be identified. Accordingly, the application file structure 304 may not be properly identified.

Figure 3C:
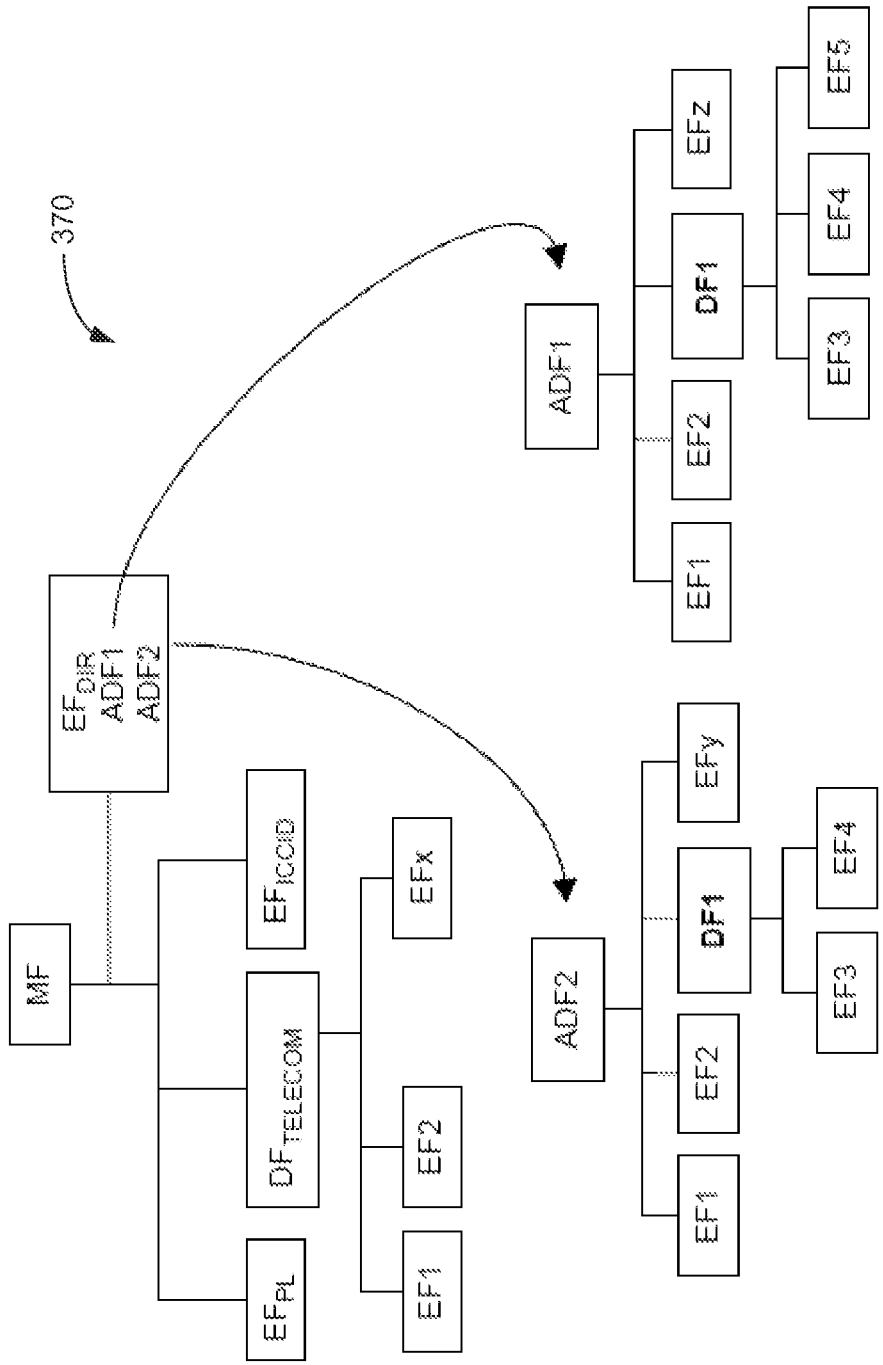
FIG. 3C illustrates a detailed view of a file structure of an application, according to some embodiments.

FIG. 3C illustrates a more detailed view 370 of the application file structure 304 for eSIM 302 of FIG. 3A. The file identifier (FID) is used to address or identify a specific file. The file types included in FIG. 3C includes:

Dedicated File (DF): file containing access conditions, and, optionally, Elementary Files (EFs) or other Dedicated Files (DFs). DFs are referenced by FIDs.

Application Dedicated File (ADF): entry point to an application. Specifically, an Application DF (ADF) is a particular DF that contains all the DFs and EFs of an application.

Elementary files (EF): The valid IMSI value must be present by default in the elementary file of the IMSI (EF IMSI) in the SIM at production of the SIM card.

Master File (MF).

Applications are uniquely identified by AIDs and are obtained from $EF_{DIR}$. The AIDs are used to select the application. $EF_{DIR}$, $EF_{PL}$ and $EF_{ICCID}$ can be mandatory and reside directly under the MF. $DF_{TELECOM}$ can be optional, and, if present, it resides under the MF. $DF_{TELECOM}$ can contain application-independent information.

Figure 4:
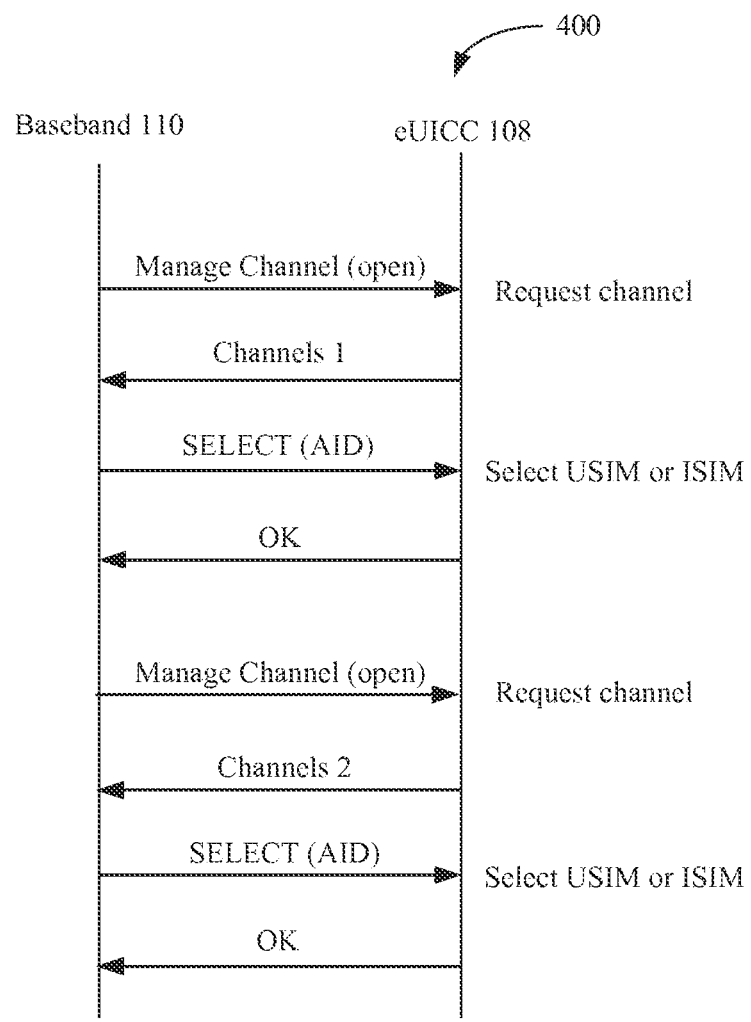
FIG. 4 illustrates a timing diagram for selecting an application of a specific eSIM included in an eUICC, according to some embodiments.

FIG. 4 illustrates a timing diagram 400 for selecting an application of a specific eSIM included in an eUICC. The process begins with the baseband processor 110 of the mobile device 102 requesting a channel for communication. The eUICC responds with a channel selection, e.g., channel 1. The baseband processor 110 then sends a SELECT (AID) command, requesting access to the application associated with the specified AID. The baseband processor 110 can then repeat the process to access another application; hence two parallel sessions can be active. The method can be successful to select the proper application in an eSIM with the structure described in FIG. 3A. However, in the case where there are multiple eSIMs in an eUICC (e.g., FIG. 3B), a conflict can occur since the applications can be the same. The application may have been issued by different MNOs and the eSIMs can have the same ICCID. Consequently, the method of FIG. 4 may not identify the proper application file structure since the application identifiers can be the same, e.g., AID_1 307.

Figure 5A:
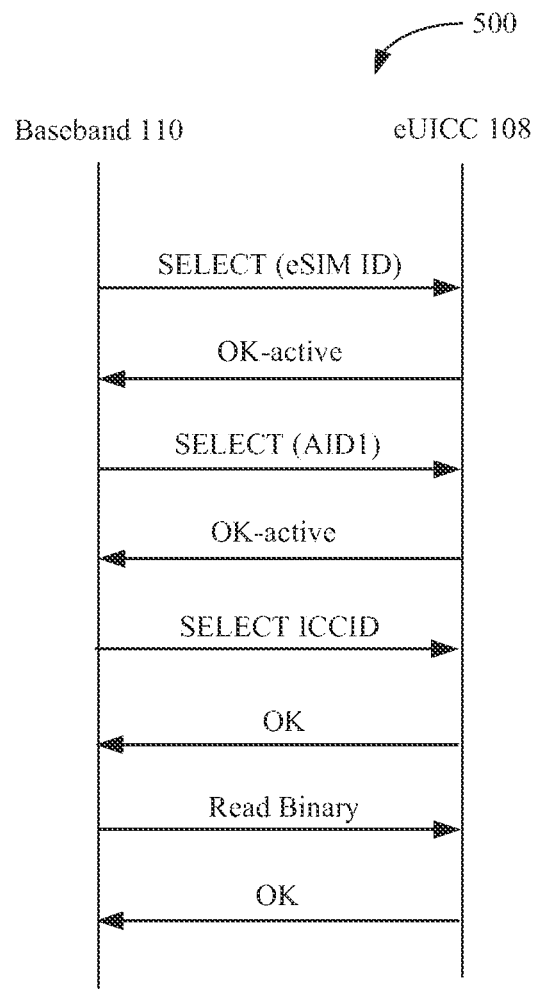
FIG. 5A illustrates a timing diagram for selecting and accessing an application of an eSIM among multiple eSIMs that include the application, according to some embodiments.

FIG. 5A illustrates timing diagram 500 for selecting and accessing an application of an eSIM among multiple eSIMs that include the application. To begin, the baseband 110 transmits a SELECT (eSIM ID) command to the eUICC that identifies an eSIM and requests access to the eSIM. In response, the eUICC can transmit an acknowledgement message (e.g. OK) indicating an active status. If the mobile device 102 is inactive, the baseband processor 110 cannot access the eSIM. Based on MNO constraints, there may be only one eSIM active at a time. The SELECT (eSIM ID) can select the particular eSIM, e.g., eSIM1_354 or eSIM_2 356. The P1/P2 illustrated in FIG. 5B, and described below in greater detail, can include values that specify the type of SELECT command, e.g. eSIM selection. To switch between eSIM1_354 and eSIM_2 356, the baseband processor 110 can issue a "deselect" command, then make a new selection. For example, SELECT (P1, P2) can indicate to deselect a first eSIM, and SELECT (P3, P4) can indicate to select a second eSIM.

When the eSIM is active, the baseband processor 110 can respond with a SELECT (AID_1 307) command, which represents a request for a specific application (and application file structure 304). After a positive response from the eUICC, the baseband processor 110 can send a SELECT (ICCID) to select the specific application. After a positive response from the eUICC, the baseband processor 110 can send a READ BINARY command to the eUICC. The Read Binary response message can include (part of) the content of an EF with transparent structure. Additionally, the eSIM can include a subsidy lock that prevents an eUICC from being programmed to select a particular MNO. The subsidy lock can restrict the MCC/MNC selection.

Figure 5B:
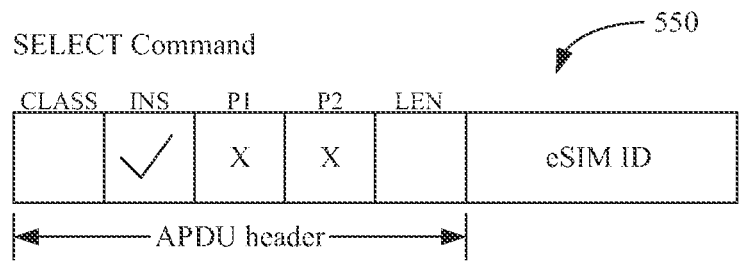
FIG. 5B illustrates a frame structure that supports the timing diagram of FIG. 5A, according to some embodiments.

FIG. 5B illustrates the frame structure 550 that supports the timing diagram 500. As shown in FIG. 5B, the frame structure 550 includes an APDU header and eSIM ID. The APDU header includes the following frames: SELECT CLASS, INS (instruction code), P2/P2 and LEN (length). The APDU header is included in the standards for eUICC operation. The same INS codes as included in the standards are utilized in the timing diagram 500. For embodiments set forth herein, in order to provide unique identification of the applications, P1/P2 frames are assigned particular values that are not included in the standards. Via this P1/P2 programming, the baseband processor 110 is able to implement the communication method described in timing diagram 500. Thus, baseband processor 110 can select and access the file related to the application of interest. As previously noted, the eSIM ID is a combination of a file structure, data and applications to be provisioned onto, or present on, an eUICC, and which allows, when enabled, the access to a specific mobile network infrastructure.

Figure 5C:
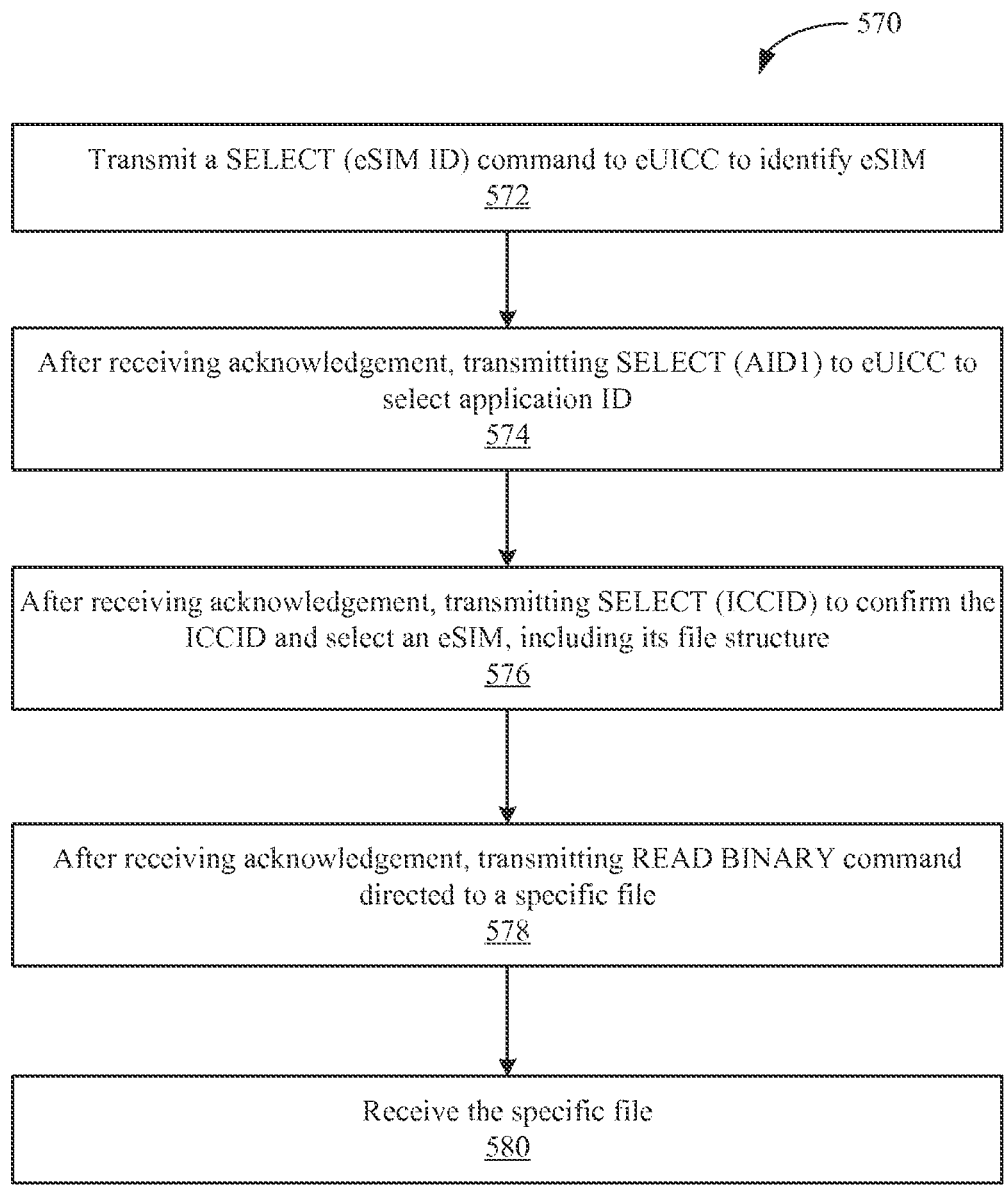
FIG. 5C illustrates a flowchart for a method related to FIG. 5A and FIG. 5B, according to some embodiments.

FIG. 5C illustrates a flowchart 570 for a method related to FIG. 5A and FIG. 5B. Specifically, the steps in the flowchart are implemented by the baseband processor 110, and are carried out as follows:
1. Transmitting a SELECT (eSIM ID) command to an eUICC to an identify eSIM—572
2. After receiving an acknowledgement, transmitting a SELECT (AID1) command to the eUICC to select an application associated with the identifier "AID1".—574
3. After receiving an acknowledgement, transmitting a SELECT (ICCID) command to confirm the ICCID and select an eSIM, including its file structure (e.g., the application file structure 304).—576
4. After receiving an acknowledgement, transmit a READ BINARY command directed to a specific file.—578
5. Receiving the specific file.—580

Notably, this method is backward compatible (transparent) with eUICCs designed to standards. Specifically, the eUICC OS can remember the last-selected eSIM, where the eSIM ID selects the eSIM, and the P1/P2 coding determines the particular type of SELECT command, e.g. a select command to select an eSIM.

Figure 6A:
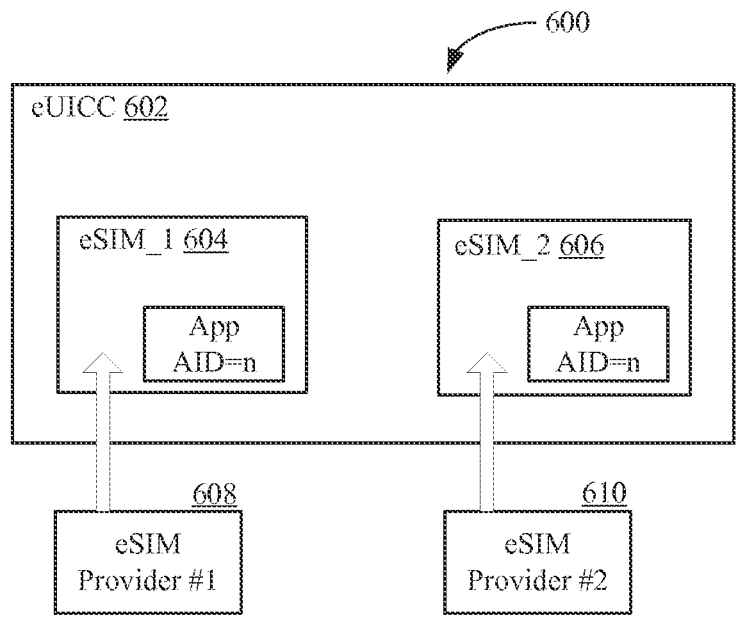
FIG. 6A illustrates a block diagram of an eUICC that stores multiple eSIMs from multiple eSIM providers, according to some embodiments.

FIG. 6A illustrates block diagram 600 of an eUICC 602 that includes an eSIM_1 604 and an eSIM_2 606. As shown in FIG. 6A, each of the eSIM_1 604 and the eSIM_2 606 includes an application whose AID is "n", which illustrates issues that can occur when eUICCs are implemented. Specifically, the different eSIMs may come from different un-coordinated sources, which is illustrated by eSIM Provider #1 (e.g., AT&T) and eSIM Provider #2 (e.g., T-Mobile). The different sources can use the same AIDs for applications included in eSIMs, which, as described herein, can cause conflicts when accessing a particular application via its AID. Hence, a conflict can occur if the eUICC has multiple eSIMs with the same applications that were provided by different sources.

Figure 6B:
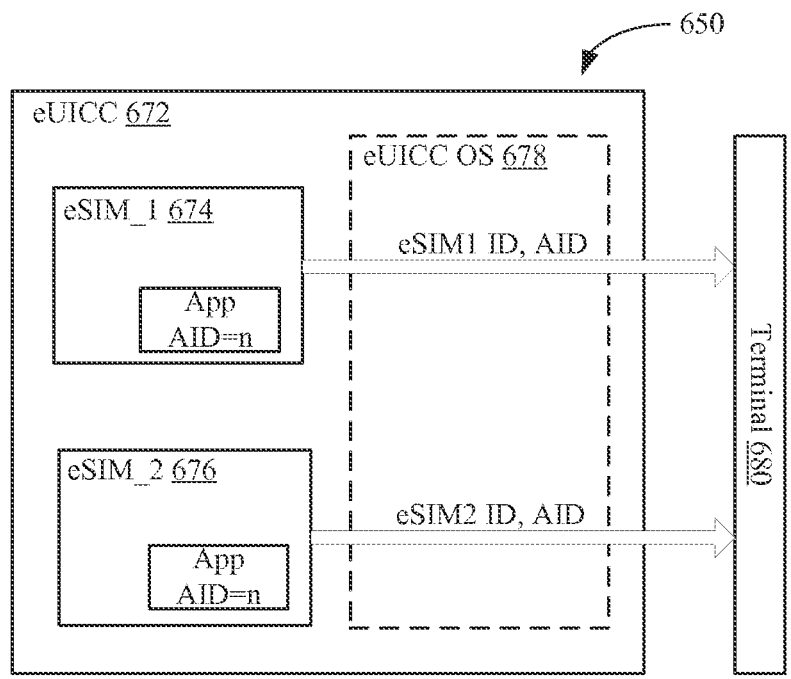
FIG. 6B illustrates a block diagram of an eUICC that stores multiple eSIMs that are selected by a terminal using logical channels, according to some embodiments.

A solution to the aforementioned problem is illustrated as block diagram 650 in FIG. 6B. As shown in FIG. 6B, the block diagram 650 includes an eUICC 672 that includes an eSIM_1 674 and an eSIM_2 676. Each of these eSIMs supports the same application and AID, i.e., per FIG. 6B: APP, AID=n. Here, the eUICC OS 678 is configured to coordinate the transmission of application information to a terminal 680 (e.g., the baseband processor 110 of FIG. 1) by the eSIM's identifier (e.g., eSIM ID) and the application's identifier (AID). More specifically, the eUICC OC 678 is configured to establish a logical channel using (eSIM ID, AID). These logical channels eliminate the potential conflicts set forth herein that would otherwise occur.

The embodiment of block diagram 650 can support a number of features. AIDs within the same eSIM are unique, i.e., guaranteed by the eSIM vendor, similar to legacy UICC. However, AIDs from different eSIMs can be duplicated on the eUICC among different eSIMs. AID conflicts can be avoided with eUICC OS 678 handling. For an application, its associated eSIM must be first selected on a given logical channel before the applications can be selected. Thus, the eUICC OS 678 can have the knowledge of which eSIM is associated with this AID on a given logical channel. Each application is uniquely identified by the command (eSIM ID, AID). Terminals are aware of different eSIMs on eUICC via an eSIM ID. In another embodiment, multiple eSIMs can be activated on an eUICC using multiple logical channels. Each logical channel can simultaneously select a different MNO. Therefore, the mobile device 102 can access two or more MNOs at the same time.

Figure 6C:
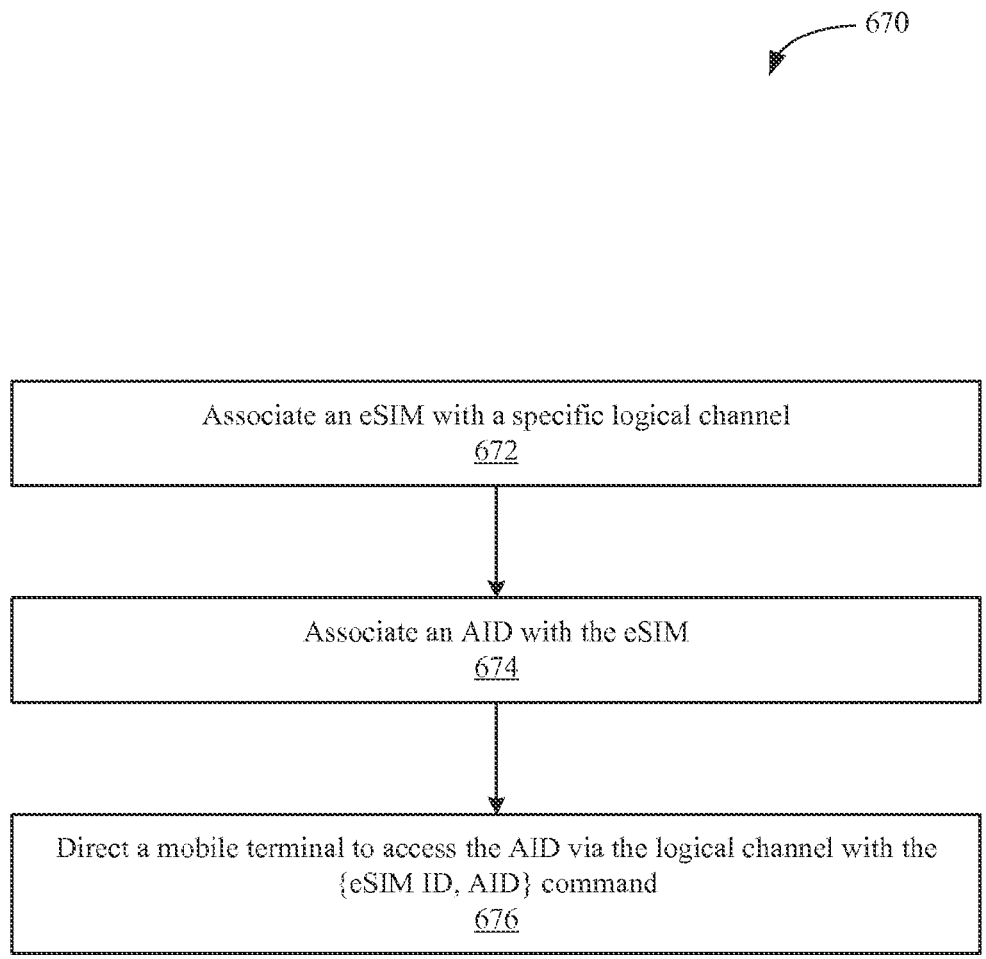
FIG. 6C illustrates a flowchart for a method related to FIG. 6A and FIG. 6B, according to some embodiments.

FIG. 6C illustrates a flowchart 670 for a method related to FIG. 6A and FIG. 6B. The method includes the following steps, which are carried out by the eUICC OS 678 of FIG. 6B:
1. Associate an eSIM with a specific logical channel. —672
2. Associate an AID with the eSIM. —674
3. Direct a mobile terminal (e.g., the mobile terminal 680 of FIG. 6B) to access the AID via the logical channel with the {eSIM ID, AID} command set forth herein. Terminal 680 can be the equivalent of the baseband processor 110 illustrated in FIG. 1 and described above in greater detail.—676

Figure 7:
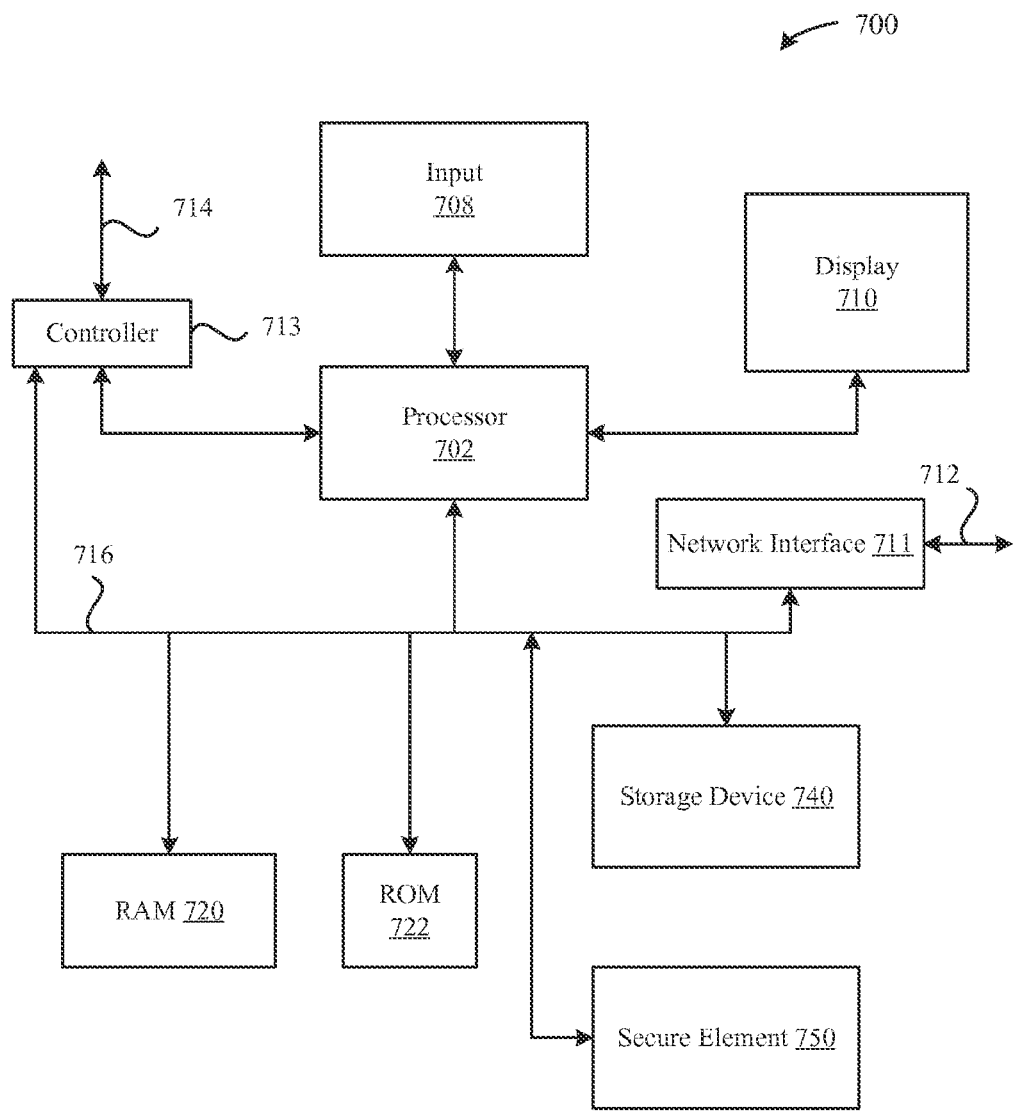
FIG. 7 illustrates a detailed view of a computing device that can be used to implement the various components described herein, according to some embodiments.

FIG. 7 illustrates a detailed view of a computing device 700 that can be used to implement the various components described herein, according to some embodiments. In particular, the detailed view illustrates various components that can be included in the mobile device 102 illustrated in FIG. 1. As shown in FIG. 7, the computing device 700 can include a processor 702 that represents a microprocessor or controller for controlling the overall operation of computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, etc. Still further, the computing device 700 can include a display 710 (screen display) that can be controlled by the processor 702 to display information to the user. A data bus 716 can facilitate data transfer between at least a storage device 740, the processor 702, and a controller 713. The controller 713 can be used to interface with and control different equipment through and equipment control bus 714. The computing device 700 can also include a network/bus interface 711 that couples to a data link 712. In the case of a wireless connection, the network/bus interface 711 can include a wireless transceiver.

The computing device 700 also includes a storage device 740, which can comprise a single storage device or a plurality of storage devices, and includes a storage management module that manages one or more partitions within the storage device 740. In some embodiments, storage device 740 can include flash memory, semiconductor (solid state) memory or the like. The computing device 700 can also include a Random Access Memory (RAM) 720 and a Read-Only Memory (ROM) 722. The ROM 722 can store programs, utilities or processes to be executed in a non-volatile manner. The RAM 720 can provide volatile data storage, and stores instructions related to the operation of the different software processes described herein. The computing device 700 can further include a secure element 750 that can represent the eUICC 108 illustrated in FIGS. 1-2 and described in detail herein.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for accessing a file in an embedded Universal Integrated Circuit Card (eUICC) that stores electronic Subscriber Identity Modules (eSIMs), the method comprising:
at the eUICC, wherein the eUICC is included in a mobile device that includes a processor:
  in response to receiving a first command from the processor via a logical channel:
    selecting a first eSIM specified by the first command, and
    confirming an active status of the first eSIM;
  in response to receiving a second command from the processor via the logical channel:
    selecting an application based on an application identifier (AID) specified by the second command, and
    confirming selection of the application; and
  in response to receiving a third command from the processor via the logical channel:
    transmitting the file to the processor, wherein the file is specified by the third command.

2. The method as recited in claim 1, wherein each of the first command, the second command, and the third command is a SELECT command.

3. The method as recited in claim 2, wherein the first command is a SELECT (eSIM ID) command comprising an Application Protocol Data Unit (APDU) header and an eSIM Identifier (ID), and the APDU header comprises P1 and P2 fields that determine an element to be selected.

4. The method as recited in claim 2, wherein the first command is a SELECT (eSIM ID) command that selects the first eSIM.

5. The method as recited in claim 2, wherein the second command is a SELECT (AID) command.

6. The method as recited in claim 2, further comprising receiving at the eUICC a fourth command that comprises a SELECT command for an Integrated Circuit Card ID (ICCID).

7. The method as recited in claim 1, wherein the third command is a READ Binary command.

8. The method as recited in claim 1, wherein the first eSIM is the only active eSIM in the eUICC.

9. The method as recited in claim 1, wherein the first eSIM is one of two or more active eSIMs in the eUICC.

10. The method as recited in claim 1, wherein the processor selects a second eSIM by deactivating the first eSIM and subsequently activating the second eSIM.

11. The method as recited in claim 1, wherein the first eSIM comprises a subsidy lock that prevents the eUICC from being programmed to select a particular Mobile Network Operator (MNO).

12. The method as in claim 1, wherein the first command directs the eUICC to activate or to deactivate content of the first eSIM.

13. A mobile device, comprising:
an embedded Universal Integrated Circuit Card (eUICC) that includes two or more electronic Subscriber Identity Modules (eSIMs);
a baseband processor;
an application processor; and
at least one memory configured to store instructions that, when executed by the application processor, cause the baseband processor to:
  transmit a command to the eUICC, wherein the command:
    identifies a first eSIM of the two or more eSIMs, and
    directs the eUICC to activate or deactivate content of the first eSIM; and
  when the first eSIM is active:
    select the first eSIM, and
    access application file structures of the first eSIM via a logical channel.

14. The mobile device as recited in claim 13, wherein at least two of the two or more eSIMs are active within the eUICC simultaneously.

15. The mobile device as recited in claim 13, wherein the baseband processor, using multiple logical channels, simultaneously accesses at least two of the two or more eSIMs.

16. The mobile device as recited in claim 13, wherein the command is a SELECT (eSIM ID) command that comprises an Application Protocol Data Unit (APDU) header and an eSIM Identifier (ID), and the APDU header comprises P1 and P2 fields that determine an element to be selected.

17. A non-transitory computer readable storage medium configured to store instructions that, when executed by a baseband processor included in a mobile device, cause the mobile device to route commands to specific electronic Subscriber Identity Modules (eSIMs) managed by an embedded Universal Integrated Circuit Card (eUICC) included in the mobile device, by carrying out steps that include:
transmitting a first command via a logical channel to select a first eSIM;

transmitting a second command via the logical channel to select an application of the first eSIM based on an application identifier (AID);

transmitting a third command via a logical channel to confirm an Integrated Circuit Card ID (ICCID) associated with the first eSIM; and receiving binary data from an application dedicated file (ADF) of the first eSIM.

18. The non-transitory computer readable storage medium as recited in claim 17, wherein each of the first command, the second command, and the third command is a SELECT command, and the first command is a SELECT (eSIM ID) command.

19. The non-transitory computer readable storage medium as recited in claim 17, wherein at least two eSIMs are active simultaneously within the eUICC.

20. The non-transitory computer readable storage medium as recited in claim 17, wherein the mobile device selects a second eSIM by deactivating the first eSIM and subsequently activating the second eSIM.

* * * * *